United States Patent [19]

de La Farge et al.

[11] 4,227,645
[45] Oct. 14, 1980

[54] ELECTRONIC AIR CONDITIONER

[75] Inventors: Bertran de La Farge, Toulouse; Alain Vincent, Fenouillet, both of France

[73] Assignee: Institut Technique Du Porc, Paris, France

[21] Appl. No.: 917,043

[22] Filed: Jun. 19, 1978

[30] Foreign Application Priority Data

Jun. 17, 1977 [FR] France ............................ 77 18678

[51] Int. Cl.³ ............................................. F24F 7/00
[52] U.S. Cl. ........................................ 236/49; 62/207;
165/11 R; 236/1 C; 236/94
[58] Field of Search ............... 236/68 B, 1, 44 C, 94,
236/49; 62/176 E, 127, 209; 165/21, 11

[56] References Cited

U.S. PATENT DOCUMENTS

| | | | |
|---|---|---|---|
| 3,743,009 | 7/1973 | Dagerford | 236/44 C |
| 4,058,254 | 11/1977 | Hallgreen | 236/68 B |
| 4,089,462 | 5/1978 | Bradford | 236/68 B |

Primary Examiner—William E. Wayner
Attorney, Agent, or Firm—Pollock, Vande Sande & Priddy

[57] ABSTRACT

Means for air conditioning a building interior so as to afford optimum comfort to all its occupants in terms of their physical characteristics. An automatic control mechanism monitors devices for measuring humidity, air velocity, bulb temperature, and the weight and body temperature of humans or animals occupying the said interior. The mechanism comprises a calculator assembly comprising a computer and a comparator. Control is effected by comparing in the comparator the ideal temperature calculated by the computer with the actual measured temperature. The transmitted error signal imposes the control either on a heater or on a ventilator 1 in response to a command signal from a thermostat.

18 Claims, 4 Drawing Figures

ELECTRONIC AIR CONDITIONER

The present invention relates to means for air conditioning building interiors.

An object of the invention is to provide an electronic air conditioner whose operating principle is a particular application of the general air conditioning technique described in applicant's French Patent Application No. 75 11 587, filed Apr. 14, 1975.

Devices for conditioning the air in buildings are known in the art. As a rule, their principle is to insert a loop control on a parameter which affects the feeling of comfort so as to adjust it to a previously displayed value. Thus, the thermostat of a heating installation enables the internal temperature of a room to be adjusted to a predetermined value.

According to the thermostat principle, the best air conditioning devices now in use merely adjust several parameters bearing on the comfort of occupants, separately and independently of one another, to the corresponding values displayed. The occupant, who controls his climatic conditions by selecting the values in question.

In the majority of cases, these completely arbitrary values are chosen in accordance with the existing controls. They are modified when the occupant of the premises feels an urgent need for it, that is to say, usually when they have deviated considerably from their optimum value.

Indeed, everyone is familar with the fact that a parameter of comfort is never ideal under all circumstances. For example, it is known that the same temperature does not afford the same comfort when the atmosphere is humid and when it is dry. Moreover, when it is humid, the slightest breath of air causes a cold feeling which must be compensated by a higher ambiant temperature. Also, the same ambiant temperature causes a thin occupant to feel colder than a corpulant one.

It is therefore an object of the invention to control the climatic conditions of an interior so as to afford optimum comfort to all its occupants under all circumstances.

To this end, it comprises an automatic control of certain parameters affecting the feeling of comfort (temperature, air velocity, etc.) not in an arbitrary and independent manner (displayed temperature, fixed ventilation, etc.), but circumstantially, one parameter depending on the other, in response to the general atmospheric conditions of the premises and the nature of their inhabitants.

More specifically, the present invention provides such a control while taking account of an experimental relationship between all the parameters which affect the feeling of comfort.

Said parameters may be divided into two categories:
(a) those which can be acted upon directly, e.g., ambiant temperature, ventilation, air velocity, flow of fresh air, etc.; and
(b) those which are difficult to control, which depend essentially on the atmospheric conditions of the day, and evolve very slowly, e.g., humidity, wall radiation, etc.

Thus, air conditioning can only bear on the parameters of the first group.

Said relationship depends, moreover, on a given number of additional parameters representing the physical characteristics of the inhabitants of the premises, e.g., their weight, age, and animal species (the latter may be represented by their body temperature).

As a matter of fact, this relationship defines the optimum comfort for an animal species under the prevailing climatic conditions. It allows one to determine the ideal value of each parameter when all the others are fixed (any deviation from the latter will produce a feeling of discomfort).

Said experimental relationship may be shown in a general formula: $f(C_{r1} \ldots C_{rp'}, C1 \ldots C_s, P1 \ldots P_t) = 0$, depending on:
  p controllable climatic parameters $C_{r1}$,
  s non-controllable (or not easily controllable) climatic parameters C,
  t physical parameters of the occupants of the space P, representing a total of $n = p + s + t$ parameters.

The control will consist in acting on the controllable parameters $C_r$ in order to satisfy the relationship in question.

The invention therefore proposes the following procedure: An influence is brought to bear on only one of the parameters $C_r$ by calculating, with the aid of said relationship, its ideal value with respect to the remaining $n-1$ parameters and comparing said ideal value with the measured actual value of the parameter in question.

The result of the comparison, i.e., the error in the parameter, which represents the difference between the actual climate and the ideal climate, causes the operation of a first air conditioning apparatus capable of causing the latter to adjust in order to reduce that difference.

The control in this case is effected by adjusting the real value of said parameter to the ideal value calculated.

This method of control has the advantage that it can easily be reversed by adjusting the ideal value to the real value. Indeed, the error can cause the operation of a second air conditioning apparatus capable of causing changes in the value of parameters $C_r$ to evolve separately from the parameter whose ideal value is calculated in order to modify the latter in such manner as to reduce the error.

Advantageously, this type of control is carried out by an electronic device consisting of a calculator assembly and a comparator. The error signal transmitted by the comparator serves to control one or the other of the air conditioning appratuses described above.

The control is automatic and always corresponds in either case to as close an adjustment as possible of the actual climate to the ideal climate.

According to a preferred embodiment, the error signal is used to effect the control in winter on a heater and in summer on a ventilator (in this case, the calculated ideal parameter is the temperature or the velocity of the air).

Automatic summer-to-winter switching is provided by a contactor controlled by an external thermostat.

The ventilation in winter is kept at a minimum level. Nonetheless, it is preferable to adjust this level with respect to the physical parameters of the occupants of the space. For this reason, the control signal regulating the heating may be used advantageously to connect an accessory device which automatically adjust the minimum level of ventilation with respect to the physical parameters displayed.

It stands to reason that this control principle is by no means limitative. For example, the above-mentioned error signal may effectuate the control simultaneously on the heater and on the ventilator to cause the temperature and the velocity of the air to evolve together toward the ideal values. (The relationship is satisfied when the temperature and the air velocity assume these values simultaneously.)

The control may likewise be placed on parameters other than those mentioned above, without departing from the scope of the invention.

It is likewise possible to use a plurality of computers having a design similar to the previous one which place the control on different parameters $C_r$. Since each of these computers always acts on the corresponding parameter(s) in order to reduce the difference with respect to the ideal climate, the climate thus controlled always evolves towards a stable ideal climate.

Hence, such a device comprising one or more computers is placed in each building whose air is to be conditioned. It is connected at the inlet to means which measure the parameters affecting the feeling of comfort and means displaying the physical parameters of the occupants of the space and, at the outlet, to air conditioners subject to the control.

Another solution consists in connecting the above-mentioned measuring, display and air-conditioning devices of each of the locations to a single control device by means of a periodic rotary scrutator which periodically effectuates the control in each location. This solution may be advantageous for spaces located in close proximity for which a single central control device does not need excessive lengths of wiring.

The invention finds particular application in animal husbandry. Indeed, the comfort of an animal conditions its health and appetite. Air conditioning with the aid of a device embodying the principles of the invention thus permits the animal to gain substantial weight within the same breeding period in comparison with a conventional thermostat control.

To be sure, the invention is not to be construed as limited to this particular application. Other, non-limitative examples of its usability include air conditioning of hospitals (e.g., wards for patients with third-degree burns, who require a very special climatic comfort) auditoriums, restaurants, lecture rooms (subject to considerable climatic variations depending upon the number of occupants), or, quite simply, home air conditioning.

Other features and advantages of the invention will be better understood from the consideration of the following description and from the attached drawings, wherein.

Figure 1:
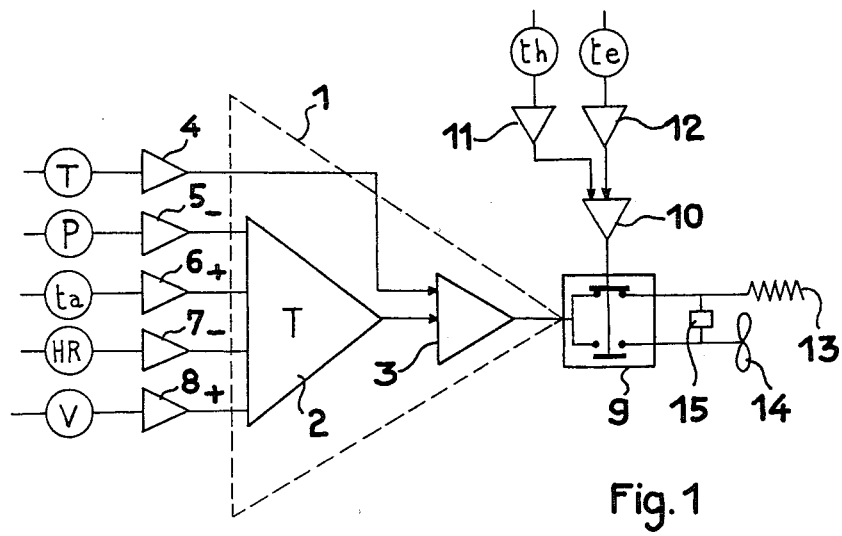
FIG. 1 is a schematic illustration of an electronic control device according to the invention.

Approximately since the beginning of this century, various researchers and zootechnicians have tried to find an equation for the very subjective feelings of comfort. Thus, they have created the concepts "dry resultant temperature," "equivalent resultant temperature," and "comfort index."

The dry resultant temperature T is a function of the ambient temperature and of the temperature of the walls as well as their radiation. It enables us to notice sensations of heat due to heat radiation (e.g., isolation of a room). In particular, it takes account of the heat radiated by any warm body, for example, by the number of occupants of a space and their body temperatures.

The equivalent resultant temperature is a function of the dry resultant temperature T, the hygrometric state (humidity) HR, and the air velocity V. It accounts for the apparent subjective temperature swings depending on the degree of humidity and the wind velocity, e.g., the feeling of cold caused by a humid air current.

The comfort index is the most elaborate concept. It enables us to appreciate variations of the level of comfort from one animal species to another and from one individual to another of the same species, for a given equivalent resultant temperature. This index is a function of the equivalent resultant temperature and the weight P, the age and the animal species of the individual (symbolized by the rectal temperature $t_a$ of the animal).

Thus, the comfort index may be represented by the function: $B = f(T, HR, V, P, t_a)$.

T dry resultant temperature, is measured directly by means of a "bulb" thermometer consisting of a conventional thermometer placed in the middle of a black steel ball preferably located on the level of the occupants, HR humidity, is measured by a hygrometer, V air velocity, may be measured by numerous means, e.g., a hot-wire anemometer or a catathermometer, which permits measurement of said velocity at the level of the occupants or, more simply, a voltmeter connected to the terminals of the ventilators blowing in fresh air, or a flowmeter measuring the flow of said fresh air (in this case the space is closed), or by a combination of said means in order to obtain a statistical measurement. All these means are called tachometers.

The measurement of the velocity of the air at the level of the occupants of the space is, indeed, rather complex, and the measuring instrument suitable therefor depends essentially on the type of space. For a closed space having a fresh-air aperture experience has shown that the measurement of the flow of fresh air is fairly indicative of this velocity. If the space also has an internal ventilator, a combination of this flow measurement and the measurement of the ventilation velocity (e.g., measurement of the voltage across the terminals fo the ventilator) may be used.

The index $B = 0$ represents the optimum comfort. The equation $f(T, HR, V, P, t_a) = 0$ permits the determination of each one of the variables as a function of the others, and is thus the ideal value of a variable (giving optimum comfort) when all the others are fixed.

Based on the experiments of K. L. Petit (Faculty of Agronomic Sciences, Ghent University, Belgium), the comfort index, after numerous studies on the behavior of pigs and man, may be represented by the equation: $B = 0.89 T + 0.05 HR - 1.81 V + 0.02 P - A(t_a)$, wherein:

T is measured in °C.

HR in percentage

V in m/s

P in kg

The expression $A(t_a)$, depending only on the animal species and on the temperature of the animal, may be taken at 21.15 for pigs and 23.15 for man.

$B = 0$ thus enables us to determine the calculated temperatures T and velocities V:

$$T = \frac{1.81\ V - 0.05\ HR - 0.02\ P + A}{0.89} =$$
$$2.03\ V - 0.056\ HR - 0.023\ P + \frac{A(t_a)}{0.89}$$

$$V = \frac{0.89\ T + 0.05\ HR + 0.02\ P - A}{1.81} =$$
$$0.49\ T + 0.027\ HR + 0.011\ P - \frac{A(t_a)}{1.81}$$

The diagrams of FIGS. 1 and 2 which will be described hereinafter show a particular, non-limitative use of these formulas. FIG. 1 shows a computer 1 comprising a calculator assembly 2 and a comparator 3.

The calculator assembly 2 is connected to the means for measuring the humidity (HR) and the air velocity (V) and to the devices for displaying the average weight P of the occupants of the space and the temperature or the animal species $t_a$ of the occupants, by means of adapters denoted by numerals 7, 8, 5 and 6, respectively.

The function of the adapters is to provide the computer with compatible and comparable signals (a voltage-mode signal if the calculation is made in the voltage mode, a current-mode signal if the computation is made in the current mode). Said adapters are likewise designed to adjust the levels of said signals (increasing or reducing the gain), so that the calculation is made with the correct quantities.

The device displaying the animal species will comprise several positions corresponding to the different species, or a scale marking the temperature of the animals. In the computation based on the above formulas, its purpose is to introduce the constant variable function of the animal species $A(t_a)$.

The device displaying the weight P, calibrated in weights, varies with every change in the average weight of all the animals.

Thus, the calculator assembly 2 may consist of an integrated circuit having four inlets which make two additions and two subtractions. The inlets associated with the addition are connected to two adapters 6 and 8, and the two inlets associated with the subtraction to two adapters 7 and 5. This makes for a very easy calculation of the formula:

$$T = 2.03\ V - 0.056\ HR - 0.023\ P + \frac{A(t_a)}{0.89}$$

As a matter of fact, the settings of adapters 8, 7, 5 and 6 permit the adjustment of the signal levels originating from the corresponding measuring and display devices, the signals being proportional to the terms 2.03 V, 0.056 HR, 0.023 P and $$\frac{A(t_a)}{0.89}$$

with which are made, respectively, the addition, subtraction, subtraction, and addition.

The calculator assembly 2 transmits an output signal which is proportional to the calculated ideal bulb temperature. Said signal is compared in comparator 3 with that originating from the bulb thermometer T. To make the comparison compatible in level and type of signal, the bulb thermometer is connected to comparator 3 by means of adapter 4.

The output signal of comparator 3 of the error signal represents the differential between the calculated ideal bulb temperature and the actual measured bulb temperature.

Said signal allows the imposition of the control on a heater 13 or a ventilator 14 by means of a multiposition contactor 9.

When the contactor is in the heating position (shown in FIG. 1), the control is "direct": in fact, the heater acts directly on the temperature bulb and tends to diminish the error signal. When the error is zero, the heater is de-energized (the counter reaction is "direct").

When contactor 9 is in the ventilation position, the control is "indirect". Indeed, ventilator 14 exercises an influence on the velocity and hence, indirectly through the calculator assembly 2, on the calculated ideal bulb temperature, tending to diminish the error signal (the counter reaction going through the calculator assembly is called indirect).

The multiposition contactor 9 is controlled by a thermostat comprising an external temperature probe $t_e$, a display device showing a given winter temperature $t_h$, and a comparator 10 comparing the signals from the probe and from the display device and transmitting a signal which is proportional to their difference. Adapters 11 and 12 enable adjustment of the signals in type and level for the comparison.

It is evident that this schematic diagram of a thermostat is purely theoretical, the latter usually being designed as a simple mechanical system of known construction, which expands under the effect of a temperature rise and closes a contact (on-off output signal) at a predetermined temperature (mechanical control).

The said system permits automatic switching from the winter-control position (on the heater) to the summer-control position (on the ventilator) in response to the external temperature.

Heater 13 and ventilator 14 are controlled by said error signal through a variable-voltage regulator which adjusts the voltage across their terminals. Said variable-voltage regulator is, for example, designed as an autotransformer in which the position of the windings is adjustable. The position of said variable-voltage regulator (position of the windings) is changed mechanically by the action of a small motor whose operation is controlled by a balanced-beam relay. The error signal varies the position of the balanced-beam relay, causing the small motor carrying the variable-voltage regulator to turn in the desired direction so as to increase or lower the voltage. This solution has the advantage of being well-tested and inexpensive (electromechanical). It goes without saying that any equivalent system may be employed without departing from the scope of the invention (thyristors).

When the control is in the heating position, minimum ventilation is assured by a minimum-ventilation display device 15. This device 15 may comprise an adjusting button calibrated in the weights of the occupants of the space, its functuion being to change the minimum ventilation in response to the value of the variable in question. It is automatically connected by said error signal when contactor 9 is in the heating position. It will be clear that said minimum adjustment may depend on other variables (e.g., on the number of occupants of the space, the animal species, etc.) and that other adjusting devices with calibrated buttons may be provided on device 15.

Figure 2:
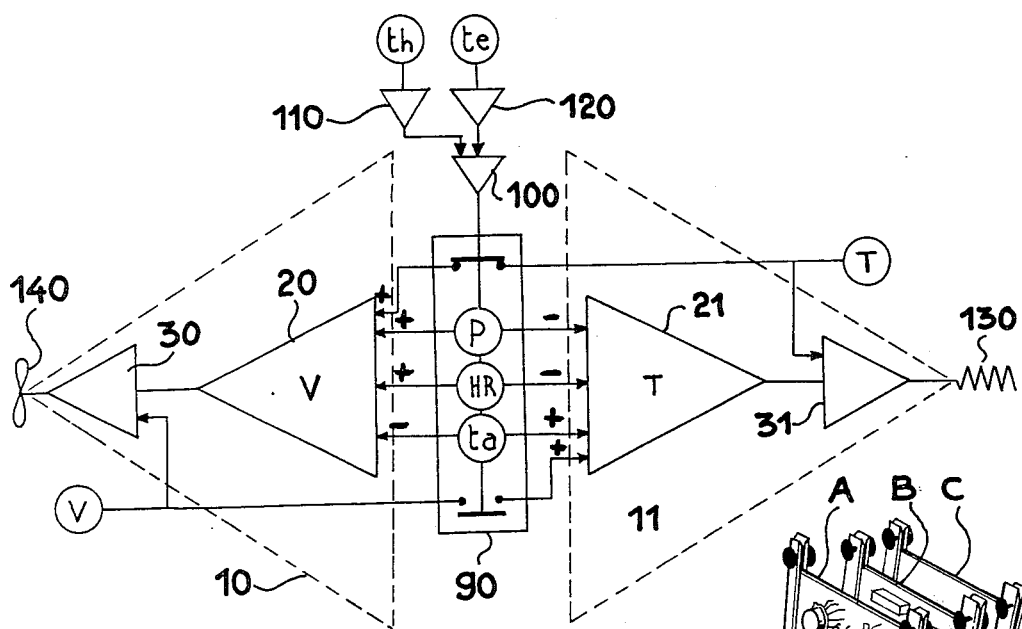
FIG. 2 shows a modification of the diagram of FIG. 1.

FIG. 2 shows a variation of the diagram of FIG. 1. In this diagram, the temperature and air-velocity controls have been separated and are both "direct". To this end, two calculator assemblies 20 and 21 calculate, respectively, the ideal velocity of the air and its ideal temperature on the basis of the humidity HR, the temperature of the animals $t_a$, the average weight of the occupants of space P and, according to the calculation, the bulb temperature T and the air velocity V.

In this FIG. 2, the input adapters have not been shown so as not to clutter the drawing.

In the event the formulas used for the calculation of T and V are, as previously:

$$T = 2.03\ V - 0.056\ HR - 0.023\ P + \frac{A(t_a)}{0.89}$$
$$V = 0.49\ T + 0.027\ HR + 0.011\ P - \frac{A(t_a)}{1.81}$$

the calculator assembly 21 is a circuit performing two additions (on variables $t_a$ and V) and two subtractions (on variables P and HR), and calculator assembly 22 is a circuit making three additions (P, T and HR) and one subtraction ($t_a$).

The regulation of temperature and velocity is effected by a thermostat through a multiposition contactor 90. As previously, the thermostat consists of an external temperature probe $t_e$, a device displaying the winter temeprature $t_h$ connected to a comparing element 100 by means of two adapters 110 and 120. In the diagram, multiposition contactor 90 is in the summer position, assuring control of the air velocity.

The ideal-velocity and ideal-bulb-temperature signals transmitted, respectively, by calculator assemblies 20 and 21 are compared directly in comparators 30 and 31 with the actual measured velocity of the air V and the actual measured temperature T. The signals transmitted by said comparators act on ventilator 140 and heater 130.

In this diagram, a device assuring a variable minimum ventilation as a function of the variables that depend on the occupants of the space has not been shown. It goes without saying that it may be triggered in response to a direct command by the heat-regulation signal.

Figure 3:
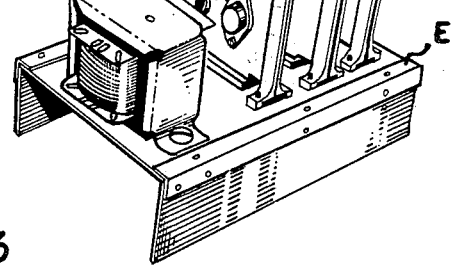
FIG. 3 is a perspective view illustrating a possible arrangement of the various electronic circuits of the control device of FIG. 1.

FIG. 3 shows three plug-in cards A, B, C on which are disposed, respectively, the electronic components of matching circuits 4, 5, 6, 7 and 8 on which are located all the settings, the calculator circuits with the integrated circuit 2, and the circuit of comparator 3; thus, there are three well-defined functions: matching, computing, and comparing. The auxiliary circuits, the thermostat, and the multiposition contactor have been omitted.

The settings, which are all grouped on card A, are subdivided into two categories:
(a) those carried out in the manufacturer's works and depending only on the circuits within the control device of FIG. 3; and
(b) those carried out at the time of installation of said device (adjustment of setting) and depending upon the external leads to various measuring and display devices.

These settings should not be tampered with once the apparatus has been put in place.

FIG. 3 also shows the supply transformer D disposed on the same chassis E as circuits A,B,C.

The diagrams of FIGS. 1 and 2 are, of course, non-limitative. They show only one control principle. All variations involving said principle are possible; for example, in the diagram of FIG. 1, elimination of thermostat-controlled multiposition contactor 9 enables the control to be imposed simultaneously on the heater and on the ventilator. The same is true for the diagram of FIG. 2 by eliminating the contactor 90.

Furthermore, the heater may well be designed as a heat pump for heating as well as for cooling. The control on said device then permits commencement in summer of an additional control of the temperature (contactors 9 or 90 may, for example, serve to reverse the operation of the pump: generation or absorption of heat). As mentioned above, this control may simultaneously be imposed on the ventilation, and it will be clear that the heat pump, which has the advantage of also serving as a heating apparatus, is only one non-limitative example of a cold-generating system.

The diagram of FIG. 2, which shows two computers, may obviously be extended to an unlimited number of computers each of which, as shown in the diagram of FIG. 1, may act simultaneously on two variables through corresponding air conditioners.

The simultaneous control of several variables makes it possible to adjust very quickly the climate of an interior space or, to put it differently, to diminish considerably the inertia of the control. This may be very advantageous in the case of large rooms exposed to fairly quick variations of environmental conditions (lecture rooms, theaters, etc.).

The experimental relationship used may, of course, be subject to considerable swings. In particular, the number of variables upon which it depends is not limited. It has been simplified in the interest of clarity of exposition and electronic simplicity. Nonetheless, since modern integrated circuits greatly facilitate all complex calculations, the most varied experimental relationships may be utilized.

More specifically, one can think of experimental relationships involving the amount of smoke measured by a smoke detector (important variable of comfort in large rooms where large numbers of people congregate), the flow of fresh air blown thereinto, etc.

Figure 4:
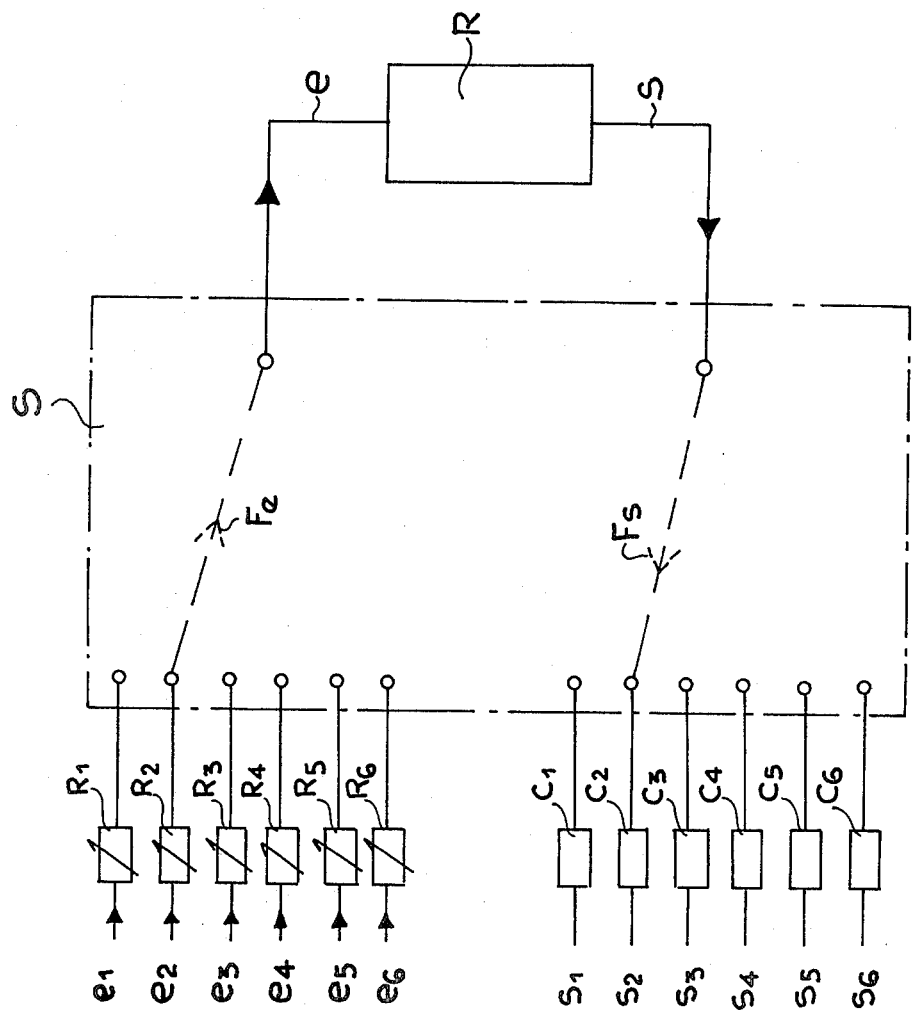
FIG. 4 is a wiring diagram showing the connection of a control device with a scrutator.

The diagram of FIG. 4 shows how it is possible to utilize a single control device R embodying the principles of the invention to subject several locations to different climatic conditions.

To this end, the input e and input s of control device R are connected to a periodic rotary scrutator comprising a specified number of input terminals (6 in the diagram: e1, e2, e3, e4, e5, e6) and output terminals (6 in the diagram: s1, s2, s3, s4, s5, s6).

The function of the scrutator is to periodically connect the input e and output s of control device R to, respectively, inputs $e_n$ and outputs $s_n$ of the scrutator so that, when input terminal $e_n$ is connected to input e of the control device, output s of said device is always connected to output terminal $s_n$ of the scrutator (in the diagram, n varies from 1 to 6). Thus, in the diagram, e2 is connected to e (arrow $F_2$ symbolizes the connection) and s is connected to s2 (arrow $F_s$ symbolizes the connection).

In practice, the scrutator, a device which is well known per se, may comprise a certain number of time-lag relays which periodically establish the contacts (symbolized by $F_e$ and $F_s$) between the various inputs and outputs of the scrutator and the control device. Thus, for example, if the connection e2, e, s, s2 has been established during a given period, it will be severed in order to establish the connection e3, e, s, s3, etc. (establishment of connection e2, e, s, s2, then e3, e, s, s3, etc.

Then $e_6$, e, s, $s_6$, then $e_1$, e, s, $s_1$, and the cycle starts again).

Such a scrutator permits the use of a single control device R to deliver the control in several locations in which defferent climatic conditions prevail. It suffices to connect each input $e_n$ to the measuring and display devices located in the buildings in question and each output $s_n$ to the devices capable of altering the climatic conditions throughout the operation and on which the control is imposed.

Thus, one input $e_2$ or one output $s_n$ is multiple. It comprises as many different terminals as measuring, display, and adjusting devices to which control device R must be connected. For example, a control device of the type described in the diagram of FIG. 1 comprises, in fact, five inputs (T, P, $t_a$, HR, V) and two outputs (e.g., one for regulating a heater and the other for a ventilator).

Each measuring or display device is connected to the scrutator through an adapter $R_n$, so that all signals arriving at different inputs $e_n$ are the same for the same climatic conditions prevailing in the various locations. In this way, the settings to be effected on controller R are identical for all the locations (each adapter $R_n$ takes the form of as many adapters as there are measuring and display devices connected to input $e_n$).

Likewise, each device capable of changing the climatic conditions of a building during operation is connected to the corresponding output $s_n$ through a control device $C_n$ ($C_n$ takes the form of as many control devices as there are devices on which the control is imposed in the location. If the control is imposed on a ventilator and if there is a means of regulating the minimum ventilation with respect to the physical parameters of the occupants of the space, said means is integrated in the control device generally denoted by the symbol $C_n$.

The diagram of FIG. 4 is a schematic diagram which is simplified in the interest of clarity. Those skilled in the art will be able to make all the electrical connections needed to operate a control system (control device plus scrutator) which operates along the principles of this invention.

In this diagram, the control is imposed periodically at six locations. It goes without saying that this number is by no means limitative.

In certain cases, the use of a single controller R for a group of locations will considerably reduce the air conditioning cost of the buildings in question.

What is claimed is:

1. Apparatus for conditioning the air in an interior space in such manner that the parameters which contribute to a feeling of comfort on the part of the occupants of said space and the physical parameters of said occupants simultaneously satisfy an experimental condition of optimum comfort, said apparatus comprising:
   at least one computer means connected to
   (i) a group of means for measuring said parameters contributing to said feeling of comfort and transmitting a signal proportional to said parameters;
   (ii) a group of means for displaying said physical parameters of said occupants of said space and transmitting a signal proportional to said parameters;
   (iii) a group of adjusting means capable of modifying, during operation, at least one said parameter contributing to said feeling of comfort,
   said computer means comprising means for controlling at least one of said adjusting means to adjust at least one said parameter contributing to said feeling of comfort in response to said signals transmitted by said means for measuring and said means for displaying, to satisfy said condition.

2. Apparatus according to claim 1, wherein said computer means comprises a calculator assembly and a comparator.

3. Apparatus according to claim 2, wherein said calculator assembly is connected to said group of display and measuring means, except one particular measuring means, and the inputs of said comparator are connected to said particular measuring means and to the output of said calculator assembly, and the output of said comparator is connected to at least one of said adjusting means, so that said comparator compares the value of the variable measured by said particular measuring means with the ideal value of said parameter calculated by said calculator assembly with respect to all the other parameters in order to satisfy said condition, and transmits a signal proportional to the difference between said two values.

4. Apparatus according to claim 3, wherein said particular measuring means is a bulb thermometer which permits measurement of the dry resultant temperature at the level of said occupants of said space.

5. Apparatus according to claim 3, wherein said particular measuring means is a device which enables a parameter to be measured approximately proportional to the velocity of the air at the level of said occupants of said space.

6. Apparatus according to any one of the claims 1 to 5, said computer means comprising a multiposition contactor for connecting to said group of adjusting means, whereby said computer means can be connected to some of said adjusting means solely with respect to the position of said contactor.

7. Apparatus according to claim 6, comprising a relay for actuating said contactor, said relay being controlled by a comparator having two inputs connected respectively to another display means and to another measuring means whereby said comparator compares a display value with a measured value and controls said relay with respect to said comparison.

8. Apparatus according to claim 7, wherein said other measuring and display means are, respectively, a thermometer measuring the temperature of the environment inside or outside said space, and means transmitting a signal proportional to an arbitrarily selected temperature, said contactor having two positions, the first being connected directly to said adjusting means of heating means and the second being connected directly to the adjusting means of ventilating and/or cold-producing means, whereby, depending on the internal or external temperature, the control is imposed selectively on a heating means and on a ventilating and/or cold-producing means.

9. Apparatus according to claim 1, comprising at least one computer means connected to said group of measuring and display means, whereby a plurality of parameters may be controlled simultaneously, or separately with the aid of a multiposition contactor inserted in said connection.

10. Apparatus according to claim 1, comprising at least one computer means and further comprising a multi-position contactor, whereby a plurality of parameters may be controlled separately.

11. Apparatus according to any of claims 1 to 5, 9 and 10, wherein said group of said adjusting means comprises a ventilating means further including a means for assuring minimum ventilation in all cases.

12. Apparatus according to claim 11, wherein said means for assuring minimum ventilation comprises means for varying said minimum ventilation with respect to the physical parameters of said occupants of said space.

13. Apparatus according to claim 11, wherein said means for assuring minimum ventilation is connected to said heating means, whereby said control on said heating means automatically connects said means.

14. Apparatus according to any one of claims 1 to 5, 9 and 10, wherein said group of said measuring means comprises a means for measuring the velocity of the air at the level of said occupants of said space, said velocity measuring means comprising means for measuring the electrical voltage across the terminals of a ventilator providing at least part of the ventilation in said space.

15. Apparatus according to any one of claims 1 to 5, 9, and 10, wherein said measuring means comprises a bulb thermometer and a tachometer measuring, respectively, the dry temperature and the velocity of the air at the level of said occupants of said space, and a hygrometer.

16. Apparatus according to claim 14, wherein said measuring means further comprises a flowmeter measuring the flow of fresh air into said space.

17. Apparatus according to any one of claims 1 to 5, 9 and 10, wherein said display means are adopted to display the weight, age, temperature and animal species of said occupants of said space.

18. A control system designed to subject a group of different buildings to climatic conditions which may be different, said system comprising a single air conditioning apparatus according to any one of claims 1 to 5, 9 and 10, and further comprising a scrutator connected in said system and, periodically establishing the connections of air-conditioning means with said measuring, display, and control means of each said space to be air conditioned, whereby a single said control means permits adjustment of the climate in several spaces whose climatic conditions may differ with respect to the weight, age and animal species of said components.

* * * * *